(12) United States Patent
Hiwada

(10) Patent No.: US 12,166,862 B2
(45) Date of Patent: *Dec. 10, 2024

(54) STORAGE SYSTEM OF KEY-VALUE STORE WHICH EXECUTES RETRIEVAL IN PROCESSOR AND CONTROL CIRCUIT, AND CONTROL METHOD OF THE SAME

(71) Applicant: KIOXIA CORPORATION, Tokyo (JP)

(72) Inventor: Kazuhiro Hiwada, Kamakura (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,101

(22) Filed: Apr. 21, 2023

(65) Prior Publication Data
US 2023/0254128 A1 Aug. 10, 2023

Related U.S. Application Data

(63) Continuation of application No. 16/805,939, filed on Mar. 2, 2020, now Pat. No. 11,664,979.

(30) Foreign Application Priority Data

Sep. 13, 2019 (JP) .................. 2019-167669

(51) Int. Cl.
*G06F 21/00* (2013.01)
*G06F 9/54* (2006.01)
(Continued)

(52) U.S. Cl.
CPC ............ *H04L 9/0836* (2013.01); *G06F 9/546* (2013.01); *G06F 12/1466* (2013.01);
(Continued)

(58) Field of Classification Search
CPC ......... H04L 9/14; H04L 9/085; H04L 9/0836; G11C 29/44; G11C 29/38; G06F 12/1466; G06F 9/546
(Continued)

(56) References Cited

U.S. PATENT DOCUMENTS 9,343,121 B2 * 5/2016 Jang .................. G11C 16/0483
9,690,652 B2 6/2017 Kanno
(Continued)

FOREIGN PATENT DOCUMENTS

JP 2014-130492 A 7/2014
JP 2017-182267 A 10/2017
(Continued)

*Primary Examiner* — Josnel Jeudy
(74) *Attorney, Agent, or Firm* — Oblon, McClelland, Maier & Neustadt, L.L.P.

(57) ABSTRACT

According to one embodiment, a storage system includes a processor, a storage device, and a first memory. The storage device includes a nonvolatile memory, a control circuit, and a second memory. The processor retrieves, based on a retrieval key and retrieval information stored in the first memory, location information of data including the retrieval key and a value, and transmits the location information and the retrieval key to the control circuit. The control circuit reads the data from the nonvolatile memory based on the location information and the retrieval key, stores the data in the second memory, retrieves the value corresponding to the retrieval key from the data, and transmits the value to the processor.

15 Claims, 10 Drawing Sheets

(51) Int. Cl.
    *G06F 12/14*     (2006.01)
    *G11C 29/38*     (2006.01)
    *G11C 29/44*     (2006.01)
    *H04L 9/08*     (2006.01)
    *H04L 9/14*     (2006.01)

(52) U.S. Cl.
    CPC .............. *G11C 29/38* (2013.01); *G11C 29/44* (2013.01); *H04L 9/085* (2013.01); *H04L 9/14* (2013.01)

(58) Field of Classification Search
    USPC ......................................................... 380/277
    See application file for complete search history.

(56) References Cited

U.S. PATENT DOCUMENTS

| | | | |
|---|---|---|---|
| 10,114,908 | B2 | 10/2018 | Parkkinen et al. |
| 10,528,286 | B2 * | 1/2020 | Madpur .............. G06F 13/1615 |
| 2012/0209855 | A1 | 8/2012 | Shinjo |
| 2015/0106380 | A1 | 4/2015 | Seo et al. |
| 2016/0239412 | A1 * | 8/2016 | Wada .................... G06F 3/0688 |
| 2017/0063701 | A1 * | 3/2017 | Morioka ................. H04L 43/16 |
| 2017/0286244 | A1 | 10/2017 | Fukutomi et al. |
| 2019/0205258 | A1 | 7/2019 | Park |
| 2019/0250695 | A1 * | 8/2019 | Ware .................... G06F 1/3278 |
| 2019/0370239 | A1 | 12/2019 | Gupta |
| 2020/0234776 | A1 | 7/2020 | Yamada et al. |
| 2020/0285418 | A1 | 9/2020 | Hara |

FOREIGN PATENT DOCUMENTS

| | | |
|---|---|---|
| JP | 2020-119618 A | 8/2020 |
| JP | 2020-144668 A | 9/2020 |

\* cited by examiner

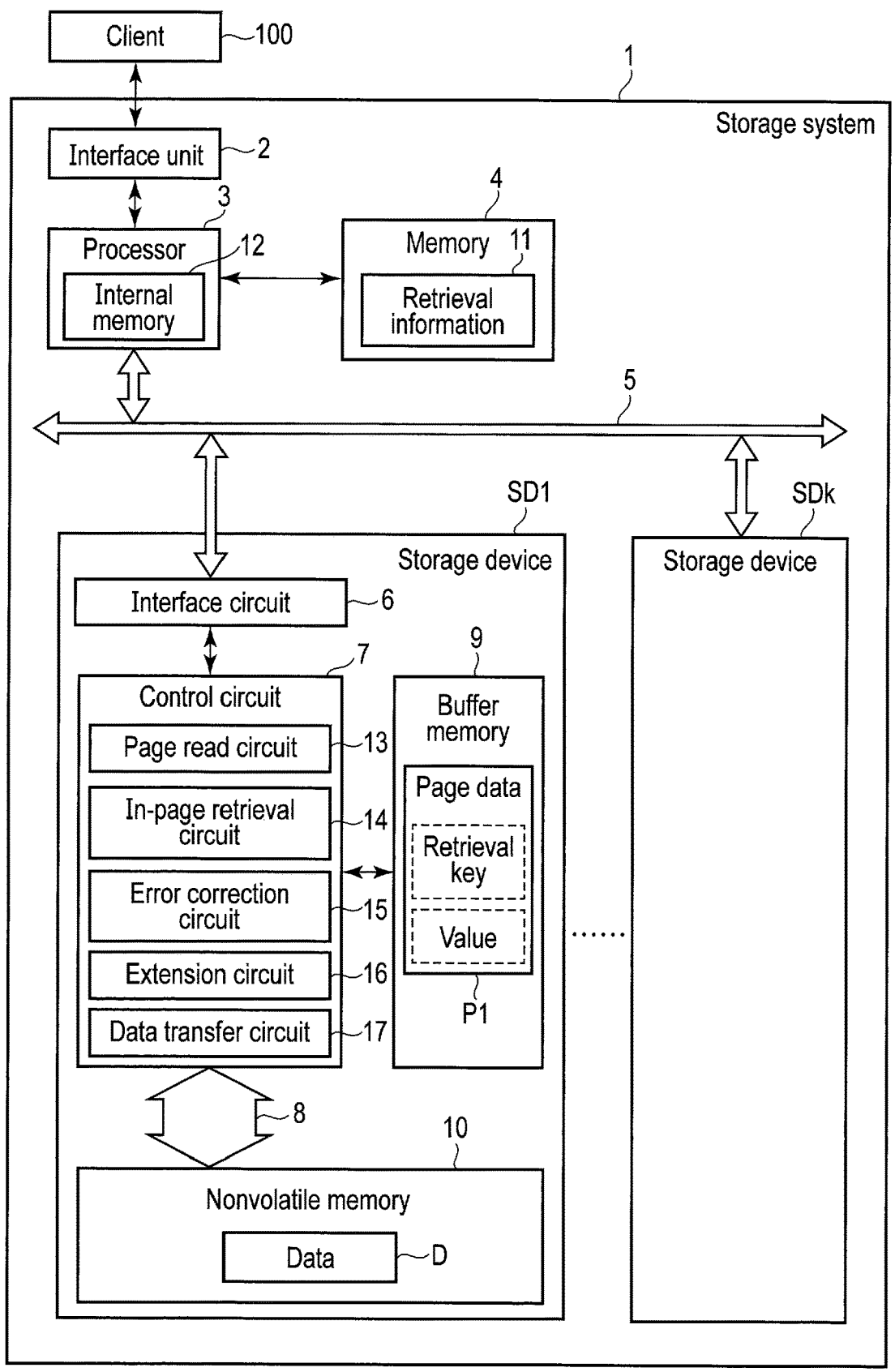
F I G. 1

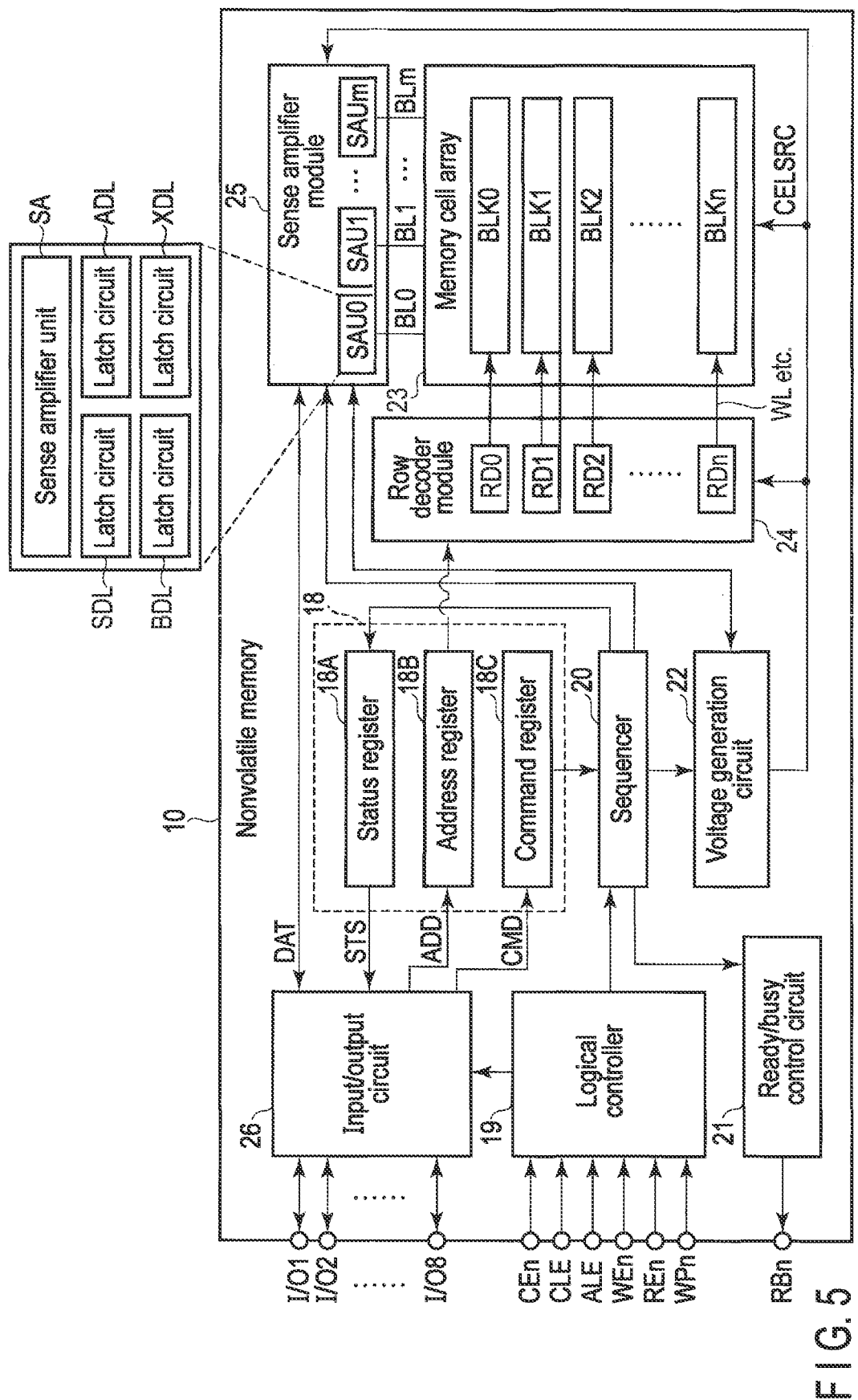
F I G. 5

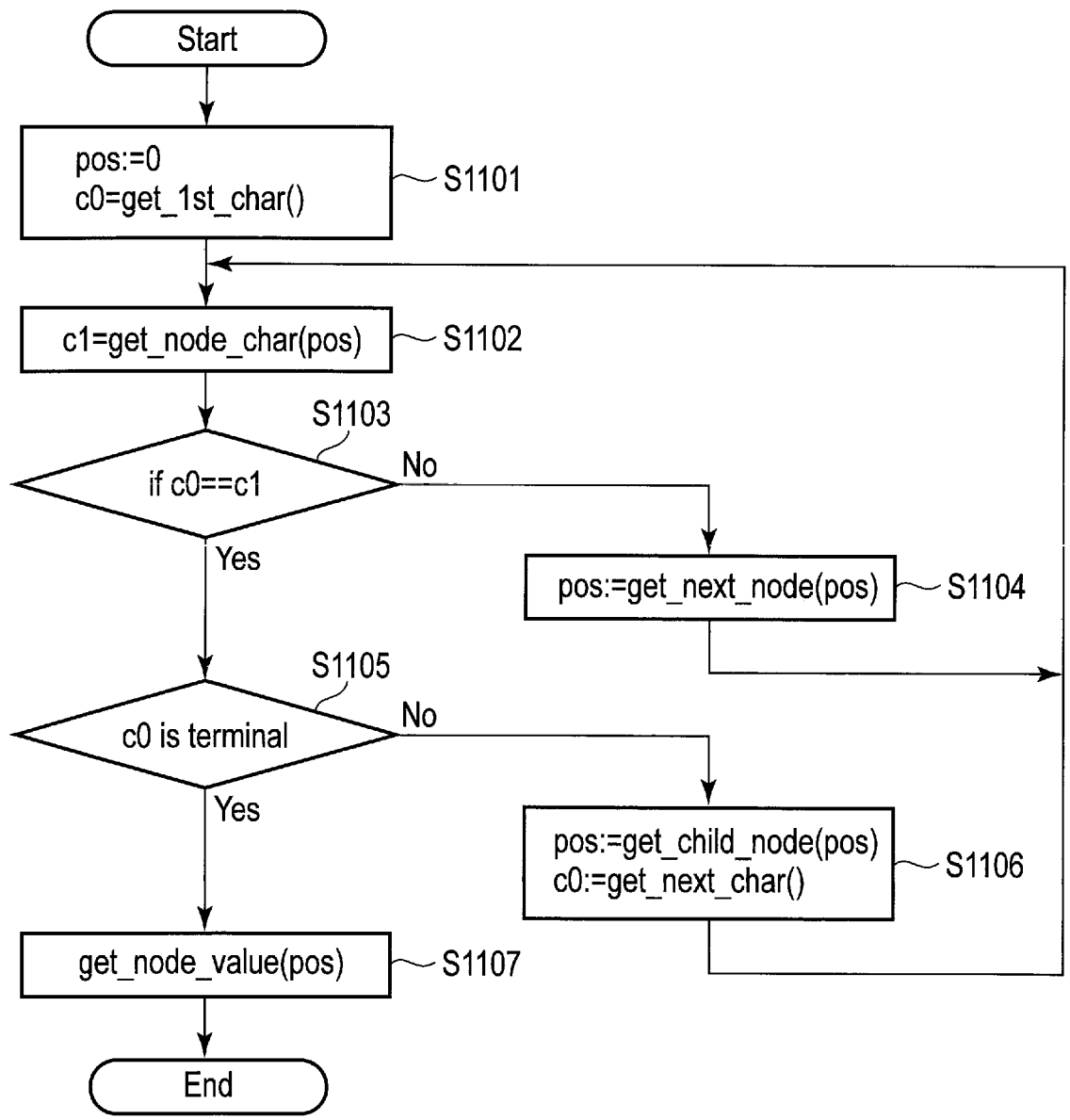
F I G. 11

STORAGE SYSTEM OF KEY-VALUE STORE WHICH EXECUTES RETRIEVAL IN PROCESSOR AND CONTROL CIRCUIT, AND CONTROL METHOD OF THE SAME

CROSS REFERENCE TO RELATED APPLICATIONS

This application is a continuation of and claims benefit under 35 U.S.C. § 120 to U.S. application Ser. No. 16/805,939, filed Mar. 2, 2020, which is based upon and claims the benefit of priority under 35 U.S.C. § 119 from Japanese Patent Application No. 2019-167669, filed Sep. 13, 2019, the entire contents of each of which are incorporated herein by reference.

FIELD

Embodiments described herein relate generally to a storage system of a key-value store (KVS), and a control method of the same.

BACKGROUND

As an example of a data management system used for creating a database, a key-value store is known.

BRIEF DESCRIPTION OF THE DRAWINGS

FIG. 1 is a block diagram illustrating an example of a storage system according to a first embodiment.

FIG. 5 is a block diagram showing an example of a configuration of a nonvolatile memory according to the first embodiment.

FIG. 11 is a flowchart showing an example of a process of an in-page retrieval circuit according to the first embodiment.

DETAILED DESCRIPTION

Figure 2:
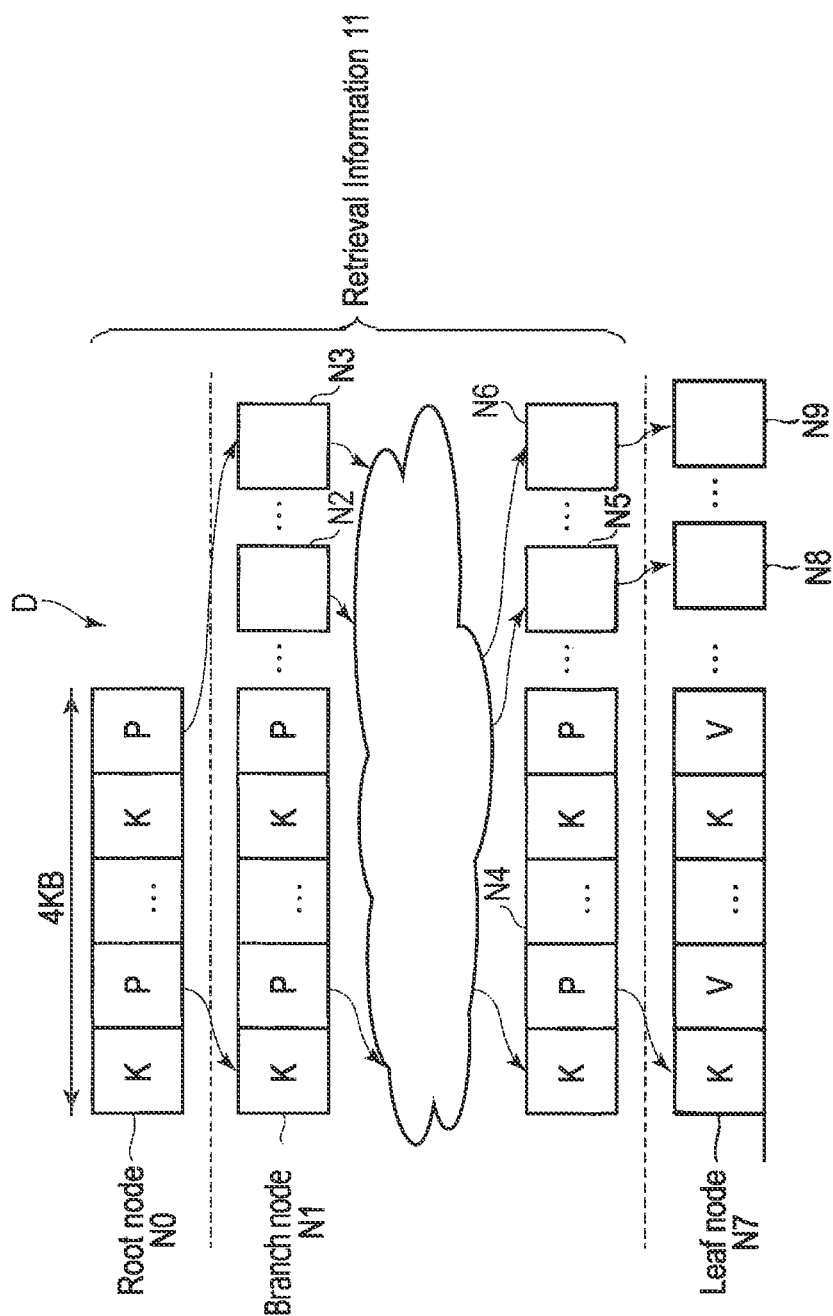
FIG. 2 is a data structure diagram showing an example of data having a tree structure and managed in the storage system according to the first embodiment.

An embodiments will be described hereinafter with reference to the accompanying drawings. In the following description, constituent elements having substantially the same function and configuration will be denoted by the same reference number, and description will be repeated only when necessary. Further, the following embodiment illustrates a device and a method which give concrete forms to technical ideas, and the technical ideas of the embodiment are not intended to limit materials, shapes, structures, arrangements, etc., of components to those descried below. The technical ideas of the embodiment can be modified in various manners in the scope of patent claims. Note that numerical values presented as examples in the following description are preferable numerical values and the embodiment is not limited to these numerical values.

In general, according to one embodiment, a storage system includes a processor, a storage device, and a first memory. The storage device retrieves, based on a retrieval key received from the processor, a value corresponding to the retrieval key. The first memory stores retrieval information used for retrieving location information of data including the value. The storage device includes a nonvolatile memory, a control circuit, and a second memory. The nonvolatile memory stores the data. The control circuit controls the nonvolatile memory. The second memory can be accessed faster than the nonvolatile memory by the control circuit. The processor retrieves the location information based on the retrieval key and the retrieval information, and transmits the location information and the retrieval key to the control circuit. The control circuit reads at least part of the data from the nonvolatile memory based on the location information and the retrieval key, stores the at least part of the data in the second memory, retrieves the value corresponding to the retrieval key from the at least part of the data, and transmits the value to the processor.

First, an overview of the present embodiment will be described.

A storage system according to the present embodiment includes a processor, a memory and at least one storage device.

The processor can access the memory faster than the storage device.

The storage device is a storage system of a KVS, and includes a control circuit, a nonvolatile memory and a buffer memory.

The storage system separately arranges data in the nonvolatile memory and the memory. More specifically, the storage system stores data including various pairs of keys and values in the nonvolatile memory. In addition, the storage system stores, in the memory, retrieval information used for retrieving location information of data including a pair of a key to be retrieved (hereinafter referred to as a retrieval key) and a value corresponding to the retrieval key.

Based on the retrieval key and the retrieval information stored in the memory, the processor retrieves the location information of data including the pair of the retrieval key and the value in the nonvolatile memory.

The control circuit reads at least part of data including the retrieval key and the value from the nonvolatile memory based on the location information retrieved by the processor, and stores the at least part of data in the buffer memory.

Subsequently, the control circuit retrieves the value corresponding to the retrieval key from the at least part of data stored in the buffer memory, executes various processes of the retrieved value, and transmits the value to the processor.

As described above, the storage system according to the present embodiment separates the process of retrieving the value corresponding to the retrieval key into the processor and the control circuit, and realizes high-speed data retrieval and realizes high IOPS (input/output per second).

The storage device provided in the storage system of the present embodiment is assumed to be, for example, a memory system such as a solid state drive (SSD). However, the same function as that of the storage system of the present embodiment can be applied to, for example, various storage devices such as a hard disk drive (HDD), a universal serial bus (USB) memory, a memory card, a hybrid storage system including an HDD and an SSD, and an optical disk device.

In the present embodiment, the storage system will be described as a KVS storage system. However, the same configuration and function as those of the storage system of the present embodiment can be applied to, for example, various database systems which set a unique label corresponding to data to be stored to the data to be stored and store the data to be stored and the label in pairs.

First Embodiment

FIG. 1 is a block diagram showing an example of a storage system 1 according to the first embodiment.

The storage system 1 is, for example, a relational database system. The storage system 1 includes an interface unit 2, a processor 3, a memory 4, a data transfer bus 5 and storage devices SD1 to SDk. The number of storage devices provided in the storage system 1 only needs to be greater than or equal to one.

The storage device SD1 includes an interface circuit 6, a control circuit 7, a transmission path 8, a buffer memory 9 and a nonvolatile memory 10.

At the time of key-value retrieval, the interface unit 2 receives a read request including a retrieval key from an external device such as a client 100, and transmits the received read request to the processor 3.

The processor 3 is, for example, a central processing unit (CPU) but may be, for example, a microprocessor. The processor 3 may be a controller which controls the storage devices SD1 to SDk.

At the time of startup of the storage system 1, the processor 3 reads a root node and a branch node (that is, non-leaf nodes) in tree-structured data D managed according to KVS from the nonvolatile memory 10 via the transmission path 8, the control circuit 7, the interface circuit 6 and the data transfer bus 5, and stores retrieval information 11 which includes the root node and the branch node but does not include any leaf node in the memory 4. The tree-structured data D of KVS will be described later with reference to FIG. 2.

The memory 4 is a memory which the processor 3 can access faster than the storage device SD1. The memory 4 is, for example, a dynamic random access memory (DRAM) or a static random access memory (SRAM), and is used as, for example, a main memory.

At the time of key-value retrieval, the processor 3 refers to the retrieval information 11 of the memory 4 based on the read request received from the client 100 via the interface unit 2, and based on the retrieval key included in the read request and the retrieval information 11, the processor 3 retrieves location information of a page (that is, a leaf node) which stores a value corresponding to the retrieval key. Subsequently, the processor 3 transmits a read request including the retrieved location information of the page and the retrieval key to the storage device SD1 via the data transfer bus 5.

The processor 3 includes an internal memory 12 which temporarily stores the value which is the result of key-value retrieval (data corresponding to the retrieval key). The internal memory 12 may be, for example, a DRAM or an SRAM.

For example, the internal memory 12 provided in the processor 3 can be accessed faster than the memory 4 used as the main memory by the processor 3, and has low latency. For example, the internal memory 12 can be used in a wider range of frequencies than the memory 4.

Note that the memory 4 and the internal memory 12 may be integrated into one memory.

The processor 3 stores the value, which is a response to the read request and is received from the storage device SD1 via the data transfer bus 5, in the internal memory 12. More specifically, a data transfer circuit 17 provided in the storage device SD1 transfers the value, which is stored in the buffer memory 9 provided in the storage device SD1, to the internal memory 12 provided in the processor 3.

The bandwidth between an internal bus (not shown) of the processor 3 and the data transfer bus 5 may be greater than the bandwidth of the data transfer bus 5. The data transfer speed between the internal bus of the processor 3 and the data transfer bus 5 may be, for example, about 40 gigabytes per second.

In the first embodiment, the bandwidth used for data transfer in the data transfer bus 5 is less than the bandwidth used for data transfer in the transmission path 8 between the control circuit 7 and the nonvolatile memory 10. The ratio between the bandwidth of the data transfer bus 5 and the bandwidth of the transmission path 8 is, for example, in a range of 1:8 to 1:800, and may be, for example, about 1:500.

The interface circuit 6 of the storage device SD1 transmits the read request, which is received from the processor 3 via the data transfer bus 5, to the control circuit 7.

The control circuit 7 is a storage subsystem, and includes a page read circuit 13, an in-page retrieval circuit 14, an error correction circuit 15, an extension circuit 16 and a data transfer circuit 17.

The control circuit 7 may be, for example, a field programmable gate array (FPGA). At least one function of the page read circuit 13, the in-page retrieval circuit 14, the error correction circuit 15, the extension circuit 16 and the data transfer circuit 17 in the control circuit 7 may be realized by, for example, executing software such as firmware by, for example, the control circuit 7 which operates as a processor.

Based on the location information of the page included in the read request received by the interface circuit 6, the page read circuit 13 transmits a read command of page-level data (hereinafter referred to as page data) stored in a location indicated by the location information of the nonvolatile memory 10 to the nonvolatile memory 10, and stores page data P1 read from the nonvolatile memory 10 in response to the read command in the buffer memory 9. In the first embodiment, the page size is, for example, 3.5 to 4.5 kilobytes, and may be, for example, about 4 kilobytes or more.

The in-page retrieval circuit 14 retrieves the value corresponding to the retrieval key from the page data P1 stored in the buffer memory 9. Here, the value corresponding to the retrieval key is assumed to be part of the read page data P1. The specific process of retrieving the value in the page data P1 by the in-page retrieval circuit 14 will be described later with reference to FIGS. 6 to 11.

The error correction circuit 15 executes an error correction process of the value retrieved by the in-page retrieval circuit 14, and stores the error-corrected value in the buffer memory 9. The error correction circuit 15 may execute an error correction process of partial data which is part of the page data P1 and includes the value and is retrieved by the in-page retrieval circuit 14, and may store the error-corrected partial data including the value in the buffer memory 9.

The extension circuit 16 extends the value which is compressed and retrieved by the in-page retrieval circuit 14, and stores the extended value in the buffer memory 9. The page data P1 may have compressed part and uncompressed part, and in this case, the extension circuit 16 extends the compressed part but does not extend the uncompressed part. Alternatively, the extension circuit 16 may extend compressed partial data which is part of the page data P1 and includes the value and is retrieved by the in-page retrieval circuit 14, and may store the extended partial data including the value in the buffer memory 9.

The error correction circuit 15 and the extension circuit 16 may execute processes of the value using the buffer memory 9 as a working memory.

The data transfer circuit 17 transfers the error-corrected and extended value, which is a response to the read request and is stored in the buffer memory 9, to the internal memory 12 of the processor 3 via the interface circuit 6 and the data transfer bus 5. The data transfer circuit 17 may collectively transfer a plurality of values stored in the buffer memory 9 to the internal memory 12 of the processor 3.

Consequently, the number of data transfer processes between the storage device SD1 and the processor 3 can be reduced, and data of a predetermined size can be efficiently transferred between the storage device SD1 and the processor 3.

The data transfer circuit 17 may be, for example, a direct memory access controller (DMAC) which realizes direct memory access (DMA) transfer. In the first embodiment, the size of data transferred from the buffer memory 9 to the internal memory 12 via the interface circuit 6 and the data transfer bus 5 by the data transfer circuit 17 is reduced to, for example, 512 bytes, which is smaller than the size of the page data P1. In addition, the performance of the data transfer circuit 17 is, for example, 4 megaIOPS.

The transmission path 8 connects the control circuit 7 and the nonvolatile memory 10 such that data can be transferred between the control circuit 7 and the nonvolatile memory 10.

The buffer memory 9 is, for example, a memory which the control circuit 7 can access faster than the nonvolatile memory 10, and may be formed of, for example, a DRAM, an SRAM, a latch circuit or a register. The buffer memory 9 temporarily stores the page data P1 which is read from the nonvolatile memory 10 in response to the read request. The buffer memory 9 may be used as the working memory of various processes of the value as described above.

The nonvolatile memory 10 stores data D including a root node, a branch node and a leaf node. The root node and the branch node stored in the nonvolatile memory 10 may be, for example, cached as retrieval information 11 in the memory 4 via the transmission path 8, the control circuit 7, the interface circuit 6, the data transfer bus 5 and the processor 3 at the time of startup of the storage system 1. More specifically, the root node and the branch node stored in the nonvolatile memory 10 may be, for example, temporarily stored in the buffer memory 9 at the time of startup of the storage system 1, and may be transferred from the buffer memory 9 to the internal memory 12 via the interface circuit 6 and the data transfer bus 5 by the data transfer circuit 17.

The nonvolatile memory 10 is, for example, a NAND flash memory but may be another nonvolatile semiconductor memory such as a NOR flash memory, a magnetoresistive random access memory (MRAM), a phasechange random access memory (PRAM), a resistive random access memory (ReRAM) or a ferroelectric random access memory (FeRAM). The nonvolatile memory 10 may include one or more memory chips. For example, the nonvolatile memory 10 may be a magnetic memory or a semiconductor memory having a three-dimensional structure. In place of the nonvolatile memory 10 or together with the nonvolatile memory 10, a magnetic disk, an optical disk, or another recording medium may be used.

Data may be read from the nonvolatile memory 10 and written to the nonvolatile memory 10 in units called pages. Data may erased from the nonvolatile memory 10 in units called blocks. One block includes a plurality of pages. Data may be read from the nonvolatile memory 10 and written to the nonvolatile memory 10 in units of a plurality of pages, and data may be erased from the nonvolatile memory 10 in units of a plurality of blocks.

In the first embodiment, the nonvolatile memory 10 may have a performance of 4 to 8 megaIPOS, or 32 gigabytes per second and may have high IPOS.

FIG. 2 is a data structure diagram showing an example of the data D having a tree structure and managed in the storage system 1 according to the first embodiment.

In the data D of FIG. 2, keys, page numbers and values are managed by a B+ tree structure. Keys are represented by K, page numbers are represented by P, and values are represented by V. In place of the B+ tree structure, another data structure such as a B tree structure, a binary tree structure or a multi-branch tree structure may be applied.

The data D has a tree structure including a root node N0, a plurality of branch nodes N1 to N6 which are lower-level nodes than the root node N0, and a plurality of leaf nodes N7 to N9 which are lower-level nodes than the branch nodes N1 to N6. The tree structure has a plurality of levels. One node of FIG. 2 corresponds to page data and may have, for example, the size of about 4 kilobytes. Page data includes an error correction code for each predetermined range, and the error correction circuit 15 can execute error correction for each predetermined range in the page data.

A plurality of keys are sorted in the data D, and similar keys are arranged in the same page data. In the first embodiment, similar keys mean that the front parts of the keys have a common character. When keys are sorted, similar keys are closely located.

The root node N0 is a node at the uppermost level of the levels, and does not have any parent node but has child nodes.

Each of the leaf nodes N7 to N9 is a node at the lowermost level of the levels, and does not have any child node but has a parent node.

In the first embodiment, the data D includes one or more levels of branch nodes N1 to N6 between the root node N0 and the leaf nodes N7 to N9.

The branch nodes between the root node and the leaf nodes may be omitted. In this case, the child nodes of the root node are the leaf nodes, and the parent node of the leaf nodes is the root node.

The root node N0 includes a plurality of pairs of keys and page numbers. Each of the page numbers included in the root node N0 is location information indicating the page location of each of the child nodes of the root node N0, that is, each of the branch nodes N1 to N3.

Each of the branch nodes N1 to N6 includes a plurality of pairs of keys and page numbers. Each of the page numbers included in each of the branch nodes N1 to N6 is location information indicating the page location of each of the child nodes, that is, each of the other branch nodes, or each of the leaf nodes.

Each of the leaf nodes N7 to N9 includes a plurality of pairs of keys and values.

In the first embodiment, at the time of startup of the storage system 1, the root node N0 and the branch nodes N1 to N6 are stored in the memory 4 as the retrieval information 11. At the time of key-value retrieval, the processor 3 retrieves location information of a leaf node including the retrieval key based on the retrieval key and the retrieval information 11.

In the first embodiment, it is possible to appropriately determine which part of the tree-structured data D is stored in the memory 4 as the retrieval information 11. However, the leaf nodes N7 to N9 are not included in the retrieval information 11. For example, the root node and part of the branch nodes may be stored in the memory 4 as the retrieval information 11.

In the first embodiment, the key may have a variable length, and the value may have a fixed length. In the first embodiment, the key may be, for example, 32 bytes on average, and the value may be, for example, 64 bits.

Figure 3:
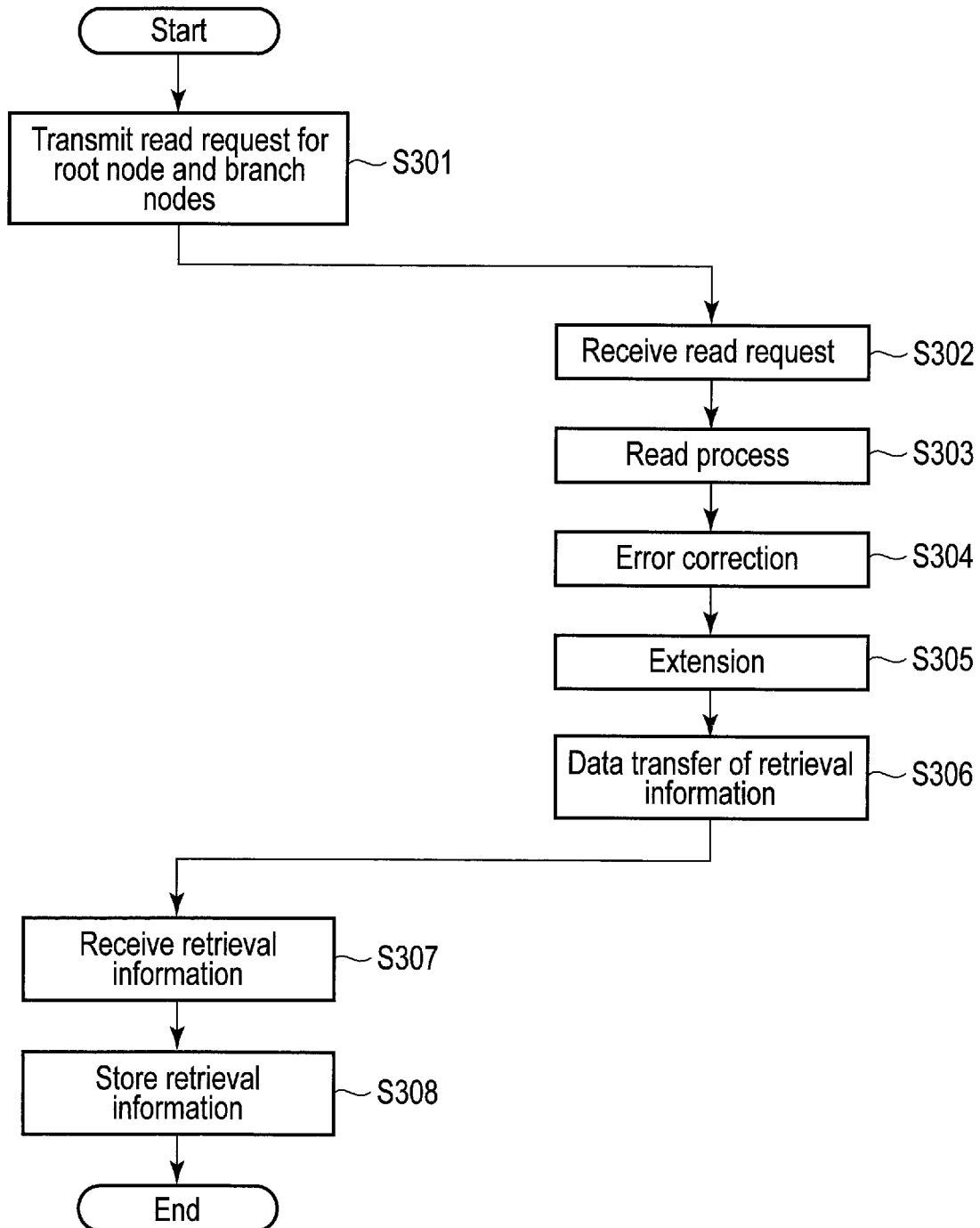
FIG. 3 is a flowchart showing an example of a process at a time of startup of the storage system according to the first embodiment.

FIG. 3 is a flowchart showing an example of the process at the time of startup of the storage system 1 according to the first embodiment.

In step S301, the processor 3 transmits a read request for retrieval information 11, which includes a root node and branch nodes but does not include any leaf node, of data D stored in the nonvolatile memory 10 to the storage device SD1 via the data transfer bus 5.

In step S302, the page read circuit 13 in the storage device SD1 receives the read request from the processor 3 via the data transfer bus 5 and the interface circuit 6.

In step S303, the page read circuit 13 reads the retrieval information 11 including the root node and the branch nodes from the nonvolatile memory 10 via the transmission path 8 based on the read request, and stores the retrieval information 11 in the buffer memory 9. The root node and the branch nodes are read, for example, in units of pages.

In step S304, the error correction circuit 15 executes error correction of the retrieval information 11 stored in the buffer memory 9.

In step S305, the extension circuit 16 extends the compressed retrieval information 11 stored in the buffer memory 9.

In step S306, the data transfer circuit 17 transfers the error-corrected and extended retrieval information 11 stored in the buffer memory 9 to the internal memory 12 of the processor 3 via the interface circuit 6 and the data transfer bus 5.

In step S307, the processor 3 receives the retrieval information 11 from the storage device SD1 via the data transfer bus 5, and stores the retrieval information 11 in the internal memory 12.

In step S308, the processor 3 stores the retrieval information 11 stored in the internal memory 12 in the memory 4.

Figure 4:
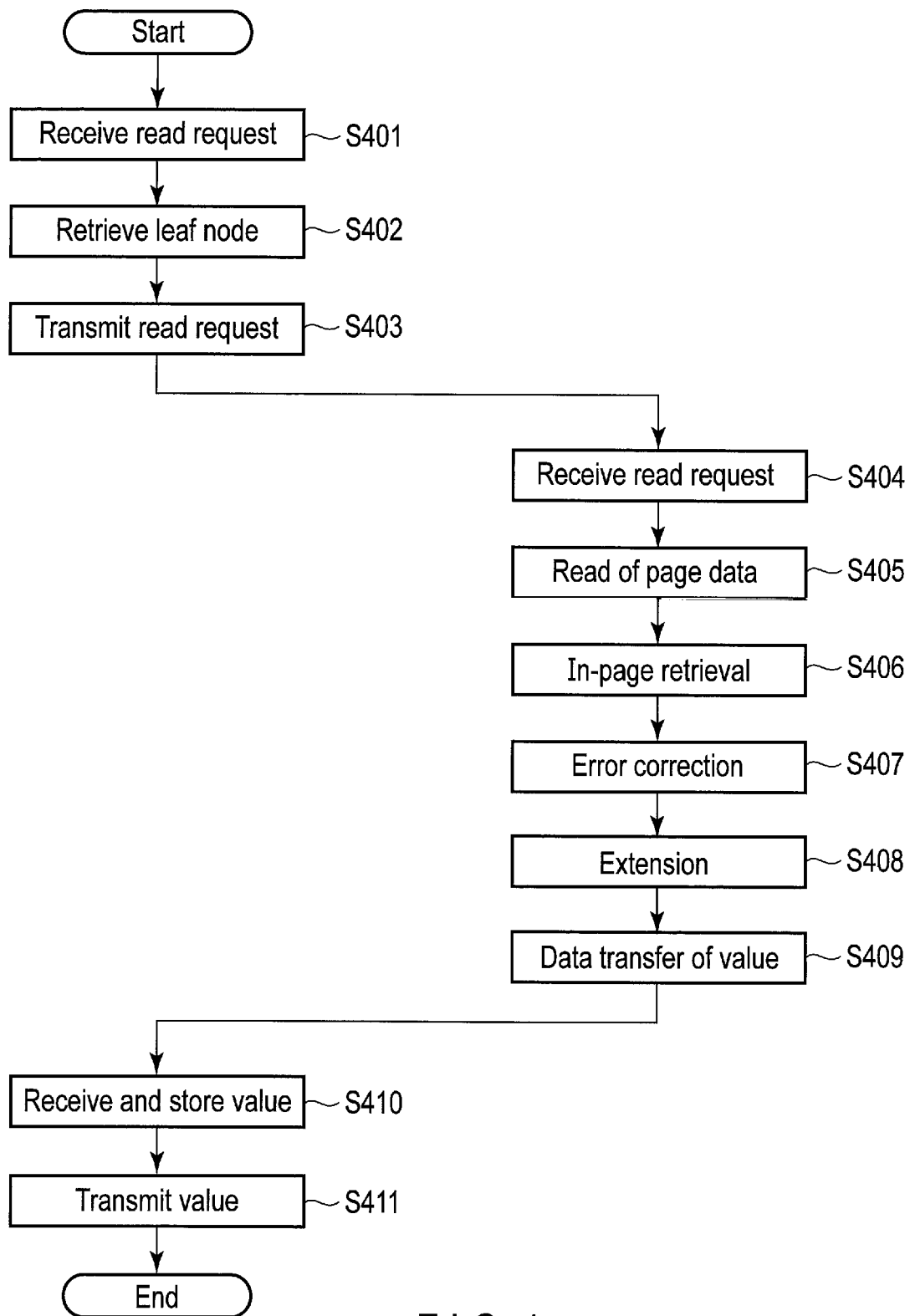
FIG. 4 is a flowchart showing an example of a key-value retrieval process executed by the storage system according to the first embodiment.

FIG. 4 is a flowchart showing an example of the key-value retrieval process executed by the storage system 1 according to the first embodiment.

In step S401, the processor 3 receives a read request including a retrieval key from the client 100 via the interface unit 2.

In step S402, the processor 3 refers to retrieval information 11 stored in the memory 4, and based on the retrieval information 11 and the retrieval key included in the read request, the processor 3 retrieves location information of a leaf node including a value corresponding to the retrieval key.

In step S403, the processor 3 transmits a read request including the retrieved location information and the retrieval key to the storage device SD1 via the data transfer bus 5.

In step S404, the page read circuit 13 in the storage device SD1 receives the read request from the processor 3 via the data transfer bus 5 and the interface circuit 6.

In step S405, the page read circuit 13 transmits a read command to the nonvolatile memory 10 via the transmission path 8 based on the read request, reads page data (that is, a leaf node) P1 including the retrieval key and the value corresponding to the retrieval key from the nonvolatile memory 10 via the transmission path 8, and stores the read page data P1 in the buffer memory 9.

In step S406, the in-page retrieval circuit 14 retrieves the value which corresponds to the retrieval key and is part of the page data P1 stored in the buffer memory 9, and stores the retrieved value in the buffer memory 9.

In step S407, the error correction circuit 15 executes error correction of the value stored in the buffer memory 9 or partial data including the value.

In step S408, the extension circuit 16 extends the compressed value stored in the buffer memory 9 or partial data including the value.

In step S409, the data transfer circuit 17 transfers the error-corrected and extended value stored in the buffer memory 9 to the internal memory 12 of the processor 3 via the interface circuit 6 and the data transfer bus 5.

In step S410, the processor 3 receives the value from the storage device SD1 via the data transfer bus 5, and stores the received value in the internal memory 12.

In step S411, the processor 3 transmits the value stored in the internal memory 12 to the client 100 via the interface unit 2.

FIG. 5 is a block diagram showing an example of the configuration of the nonvolatile memory 10 according to the first embodiment.

In the first embodiment, the nonvolatile memory 10 is a semiconductor storage device including a NAND flash memory.

The nonvolatile memory 10 includes, for example, an input/output circuit 26, a register set 18, a logical controller 19, a sequencer 20, a ready/busy control circuit 21, a voltage generation circuit 22, a memory cell array 23, a row decoder module 24 and a sense amplifier module 25.

For example, the input/output circuit 26 transmits and receives input/output signals I/O1 to I/O8 having a width of 8 bits to and from the control circuit 7 via the transmission path 8. The input/output signal may include data DAT, status information STS, address information ADD, a command CMD, and the like. In addition, the input/output circuit 26 transmits and receives the data DAT to and from the sense amplifier module 25.

The register set 18 includes, for example, a status register 18A, an address register 18B and a command register 18C. The status register 18A, the address register 18B and the command register 18C store the status information STS, the address information ADD and the command CMD, respectively.

The status information STS is updated based on an operation status of the sequencer 20, for example. In addition, the status information STS is transferred from the status register 18A to the input/output circuit 26 based on an instruction from the control circuit 7, and is output to the control circuit 7. The address information ADD is transferred from the input/output circuit 26 to the address register 18B and may include, for example, a chip address, a block address, a page address, a column address, and the like. The command CMD is transferred from the input/output circuit 26 to the command register 18C, and includes a command related to an operation of the nonvolatile memory 10.

The logical controller 19 controls each of the input/output circuit 26 and the sequencer 20 based on a control signal received from the control circuit 7. For example, a chip enable signal CEn, a command latch enable signal CLE, an address latch enable signal ALE, a write enable signal WEn, a read enable signal REn and a write protect signal WPn are used as the control signal.

The chip enable signal CEn is a signal for enabling the nonvolatile memory 10. The command latch enable signal CLE is a signal for notifying the input/output circuit 26 that the received input/output signal is the command CMD. The address latch enable signal ALE is a signal for notifying the input/output circuit 26 that the received input/output signal is the address information ADD. The write enable signal WEn is a signal for commanding the input/output circuit 26 to execute input of the input/output signal. The read enable signal REn is a signal for commanding the input/output circuit 26 to execute output of the input/output signal. The write protect signal WPn is a signal for setting the nonvolatile memory 10 to a protected state at the time of power-on/power-off.

The sequencer 20 controls the operation of the entire nonvolatile memory 10. For example, the sequencer 20 executes a read process, a write process, an erase process, etc., based on the command CMD stored in the command register 18C and the address information ADD stored in the address register 18B.

The ready/busy control circuit 21 generates a ready/busy signal RBn based on an operation state of the sequencer 20. The ready/busy signal RBn is a signal for notifying the control circuit 7 via the transmission path 8 whether the nonvolatile memory 10 is in a ready state or in a busy state. In the first embodiment, "a ready state" indicates a state where the nonvolatile memory 10 receives a command from the control circuit 7, and "a busy state" indicates a state where the nonvolatile memory 10 does not receive a command from the control circuit 7.

The voltage generation circuit 22 generates voltage used in a read process, a write process, an erase process, etc. In addition, the voltage generation circuit 22 supplies the generated voltage to the memory cell array 23, the row decoder module 24 and the sense amplifier module 25.

The memory cell array 23 includes a plurality of blocks BLK0 to BLKn (where n is an integer greater than or equal to one). A block is a set of memory cell transistors which can store data in a nonvolatile manner, and is used as a data erase unit, for example. In addition, a plurality of bit lines BL0 to BLm (where m is an integer greater than or equal to one), a plurality of word lines WL, a source line CELSRC, and a well line are provided in the memory cell array 23. For example, voltage is applied to the source line CELSRC by the voltage generation circuit 22. Each memory cell transistor is associated with one bit line BL and one word line WL.

The row decoder module 24 selects a block to be subjected to a process based on a block address. In addition, the row decoder module 24 transfers voltage supplied from the voltage generation circuit 22 to a line in the selected block. Furthermore, the row decoder module 24 includes, for example, a plurality of row decoders RD0 to RDn. The row decoders RD0 to RDn are associated with blocks BLK0 to BLKn, respectively.

In a read process, the sense amplifier module 25 reads data from the memory cell array 23 and transfers the read data to the input/output circuit 26. In a write process, the sense amplifier module 25 applies desired voltage to the bit line BL based on data received from the input/output circuit 26. For example, the sense amplifier module 25 includes a plurality of sense amplifier units SAU0 to SAUm. The sense amplifier units SAU0 to SAUm are associated with the bit lines BL0 to BLm, respectively.

Each of the sense amplifier units SAU0 to SAUm includes, for example, a sense amplifier unit SA and latch circuits SDL, ADL, BDL and XDL.

In order to simplify explanation, the explanation will be given using the sense amplifier unit SAU0. However, the same also applies to the sense amplifier units SAU1 to SAUm.

For example, in a read process, the sense amplifier unit SA of the sense amplifier unit SAU0 determines whether read data is "0" or "1" based on voltage of the corresponding bit line BL0. In other words, the sense amplifier unit SA senses data which is read to the corresponding bit line BL0, and determines data which is stored in the selected memory cell. Each of the latch circuits SDL, ADL, BDL and XDL temporarily stores read data, write data, or the like. The latch circuit XDL may be used for transmitting and receiving data DAT between the sense amplifier unit SAU0 and the input/output circuit 26.

An example of the association method of the pairs of keys and values in the page data P1 will be described.

In the first embodiment, a key is a character string. In page data P1, a character string is split into characters, and each character is managed as a node. In page data P1, a value is associated with a node.

Figure 6:
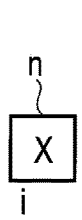
FIG. 6 is a diagram showing an expression example of a relationship between a node and a node number in a data structure of page data according to the first embodiment.

FIG. 6 is a diagram showing an expression example of the relationship between a node n and a node number i in the data structure of page data P1.

The node n shown in FIG. 6 has a character X. The character X constitutes part of a key. The node number i is assigned to the node n. In the first embodiment, a process get_node_char(i) is a process of obtaining the character X of the node n based on designating the node number i. In the case of executing the process get_node_char(i), the in-page retrieval circuit 14 obtains the character X corresponding to the node n of the node number i.

Figure 7:
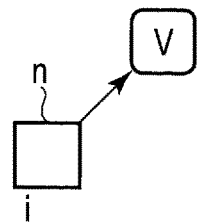
FIG. 7 is a diagram showing an expression example of a relationship between a node and a value in a data structure of page data according to the first embodiment.

FIG. 7 is a diagram showing an expression example of the relationship between a node n and a value V in the data structure of page data P1 according to the first embodiment.

A node number i is assigned to the node n shown in FIG. 7. The node n of the node number i is associated with the value V. In the first embodiment, a process get_node_value(i) is a process for obtaining the value V associated with the node n based on designating the node number i. In the case of executing the process get_node_value(i), the in-page retrieval circuit 14 obtains the value V associated with the node n of the node number i.

Figure 8:
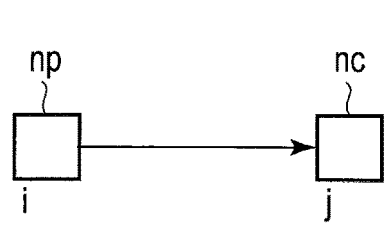
FIG. 8 is a diagram showing an expression example of nodes having a parent-child relationship in a data structure of page data according to the first embodiment.

FIG. 8 is a diagram showing an expression example of nodes np and nc having a parent-child relationship in the data structure of page data P1 according to the first embodiment. In FIG. 8, the node np located at the tail of a horizontal arrow and assigned with a node number i is a parent node. The node nc located at the tip (head) of the horizontal arrow and assigned with a node number j is a child node. In the first embodiment, a process get_child_node(i) is a process of obtaining the node number j of the child node nc with respect to the node np of the designated node number i. In the case of executing the process get_child_node(i), the in-page retrieval circuit 14 obtains the node number j of the child node nc with respect to the node np of the node number i.

Figure 9:
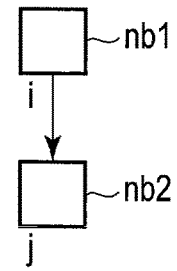
FIG. 9 is a diagram showing an expression example of nodes having a sibling relationship in a data structure of page data according to the first embodiment.

FIG. 9 is a diagram showing an expression example of nodes nb1 and nb2 having a sibling relationship in the data structure of page data P1 according to the first embodiment. In FIG. 9, the node nb1 located at the tail of a vertical arrow and assigned with a node number i is an older brother node. The node nb2 located at the tip of the vertical arrow and assigned with a node number j is a younger brother node. In the first embodiment, a process get_next_node(i) is a process of obtaining the node number j of the younger brother node nb2 with respect to the node nb1 of the designated node number i. In the case of executing the process get_next_node (i), the in-page retrieval circuit 14 obtains the node number j of the younger brother node nb2 with respect to the node nb1 of the node number 1.

Figure 10:
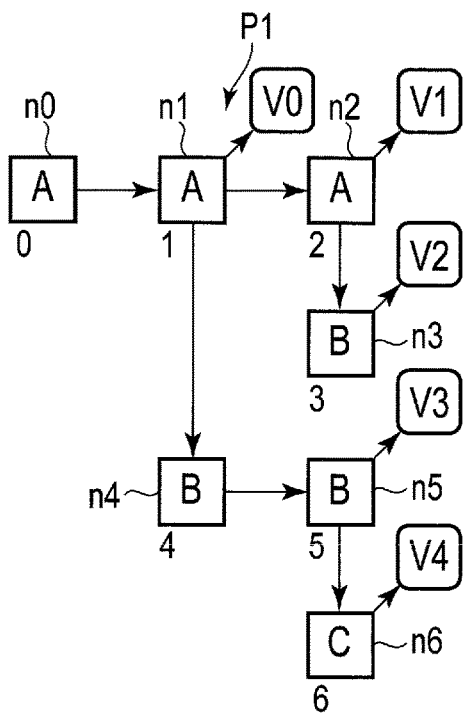
FIG. 10 is a data structure diagram showing an example of page data according to the first embodiment in graph form.

FIG. 10 is a data structure diagram showing an example of page data P1 according to the first embodiment in graph form. FIG. 10 is expressed using the node relationships described with reference to FIGS. 6 to 9.

The page data P1 forms a tree structure based on a plurality of elements which are obtained by splitting a plurality of keys included in the page data P1, and has a data structure in which a plurality of values included in the page data P1 are associated with the elements. As described above, FIG. 10 shows an example where a plurality of keys are character strings and the character strings are split into characters.

Node numbers 0 to 6 are assigned to the nodes n0 to n6, respectively.

The node n0 of the node number 0 has a character A corresponding to part of a key.

The node n1 of the node number 1 is a child node of the node n0 of the node number 0. The node n1 of the node number 1 has a character A which is part of a key. The node n1 is associated with a value V0.

The node n2 of the node number 2 is a child node of the node n1 of the node number 1. The node n2 of the node number 2 has a character A which is part of a key. The node n2 is associated with a value V1.

The node n3 of the node number 3 is a younger brother node of the node n2 of the node number 2. The node n3 of the node number 3 has a character B which is part of a key. The node n3 is associated with a value V2.

The node n4 of the node number 4 is a younger brother node of the node n1 of the node number 1. The node n4 of the node number 4 has a character B which is part of a key.

The node n5 of the node number 5 is a child node of the node n4 of the node number 4. The node n5 of the node number 5 has a character B which is part of a key. The node n5 is associated with a value V3.

The node n6 of the node number 6 is a younger brother node of the node n5 of the node number 5. The node n6 of the node number 6 has a character C which is part of a key. The node n6 is associated with a value V4.

By searching the page data P1 having the data structure of FIG. 10 based on various retrieval keys, the in-page retrieval circuit 14 can obtain the value V0 corresponding to a key AA, the value V1 corresponding to a key AAA, the value V2 corresponding to a key AAB, the value V3 corresponding to a key ABB, and the value V4 corresponding to a key ABC.

In the first embodiment, the page data P1, which forms a B+ tree structure, includes part of sorted keys. The keys included in the same page data P1 are arranged in order of similarity of contents. By expressing the keys included in the page data P1 by a binary tree in bytes, sharing a common part of the keys, and serializing the keys, it is possible to reduce the data size necessary for expressing one key to, for example, about 8 bytes. In this case, when a value is 8 bytes, a pair of a key and a value is about 16 bytes, and the page data P1 of 4 kilobytes can store about 256 pairs of keys and values. Furthermore, for example, by assigning an error correction code to each 64-byte part of the tree-structured page data P1, it is possible to execute error correction of a necessary part of the page data P1 only.

FIG. 11 is a flowchart showing an example of the process of the in-page retrieval circuit 14 according to the first embodiment.

In FIG. 11, a process get_1st_char( ) is a process of obtaining the first character of a retrieval key.

A process get_next_char( ) is a process of obtaining the next character of the retrieval key. A process get_node_char (pos) is a process of obtaining the character of a node of a node number pos as previously described.

As previously described, a process get_next_node(pos) is a process of obtaining the node number of a younger brother node with respect to the node of the node number pos.

A process get_child_node(pos) is a process of obtaining the node number of a child node with respect to the node of the node number pos.

A process get_node_value(pos) is a process of obtaining a value associated with the node of the node number pos as previously described.

In step S1101, the in-page retrieval circuit 14 sets a variable number pos to an initial value zero, and sets the first character of a retrieval key which is obtained by executing the process get_1st_char( ) to a variable number c0.

In step S1102, the in-page retrieval circuit 14 sets the character obtained by executing the process get_node_char (pos) to a variable number c1.

In step S1103, the in-page retrieval circuit 14 determines whether the variable number c0 and the variable number c1 are the same or not.

If it is determined in step 31103 that the variable number c0 and the variable number c1 are not the same, the in-page retrieval circuit 14 sets the character obtained by executing the process get_next_node(pos) to the variable number pos in step S1104. Subsequently, the process moves to step S1102.

If it is determined in step 31103 that the variable number c0 and the variable number c1 are the same, the in-page retrieval circuit 14 determines whether the variable number c0 is the terminal (end) of the retrieval key or not in step S1105.

If it is determined in step S1105 that the variable number c0 is not the terminal of the retrieval key, the in-page retrieval circuit 14 sets the character obtained by executing the process get_child_node(pos) to the variable number pos, and sets the next character of the retrieval key obtained by executing the process get_next_char( ) to the variable number c0, in step S1106. Subsequently, the process moves to step S1102.

If it is determined in step S1105 that the variable number c0 is the terminal of the retrieval key, the in-page retrieval circuit 14 obtains the value obtained by executing the process get_node_value(pos) as a value corresponding to the retrieval key in step S1107.

Note that the in-page retrieval circuit 14 may execute match retrieval and may execute read by ascending/reverse-order scanning.

In the above-described storage system 1 according to the first embodiment, the retrieval of the location information of the leaf node including the retrieval key is executed by the processor 3, and the retrieval of the value corresponding to the retrieval key in the leaf node is executed by the control circuit 7. As described above, retrieval is separated into the processor 3 and the control circuit 7, and retrieval is executed at two levels. As a result, it is possible to retrieve a desired value from a large amount of data D stored in the nonvolatile memory 100 at high speed.

The storage system 1 according to the first embodiment can be applied to a relational database using an index table, etc. In the relational database, for example, a value having a small size such as 64 bits may be used in some cases. In the first embodiment, if a value has such a relatively small size, high retrieval performance of a several tens of megaIPOS or more can be realized.

In the first embodiment, at the time of key-value retrieval, retrieval information 11 which includes a root node and branch nodes but does not include any leaf node is stored in the memory 4. As described above, since no leaf node is stored in the memory 4, the usage of the memory 4 can be reduced. For example, as a database system of a comparative example, a database system in which a value included in tree-structured data D is stored in the nonvolatile memory 10 and the other data of the tree-structured data D except the value is stored in the memory 4 at the time of key-value retrieval is considered. In the database system of the comparative example, the tree structure of the retrieval information stored in the memory 4 has one level more than that of the storage system 1 of the first embodiment. In the database system of the comparative example where the retrieval information stored in the memory 4 has one level more than that of the first embodiment, the data amount of the retrieval information stored in the memory 4 may become, for example, about 100 times larger than that of the storage system 1 of the first embodiment 1. As described above, the storage system 1 according to the first embodiment can reduce the usage of the memory 4 to about $\frac{1}{100}$ of that of the database system of the comparative example.

In the first embodiment, the control circuit 7 located closer to the nonvolatile memory 10 than the processor 3 includes the in-page retrieval circuit 14 which retrieves a value corresponding to a retrieval key in page data P1. As the in-page retrieval circuit 14 of the control circuit 7 retrieves the value corresponding to the retrieval key in the page data P1, the data transfer circuit 17 of the control circuit 7 can transfer not the entire page data P1 but only necessary data including the retrieved value from the buffer memory 9 to the internal memory 12 of the processor 3 via the interface circuit 6 and the data transfer bus 5. Therefore, it is possible to prevent unnecessary data transfer between the processor 3 and the storage device SD1, reduce the bandwidth and the data transfer amount necessary for data transfer between the processor 3 and the storage device SD1, and improve IOPS. In the first embodiment, even if the data transfer speed of the data transfer bus 5 is reduced from 16 gigabyte per seconds (4 megaIPOS×4 kilobytes) to 32 megabytes per seconds (4 megaIPOS×8 bytes), data transfer of greater than or equal to 4 megaIPOS can be executed per storage device SD1.

In the first embodiment, not the processor 3 but the control circuit 7 retrieves the value corresponding to the retrieval key from the page data P1 which is read from the nonvolatile memory 10. By executing a specific process not by the processor 3 but by the control circuit 7, it is possible to reduce the process load on the processor 3 and improve the entire performance of the storage system 1 such as IPOS. In addition, since error correction and extension is executed for the value which is part of the page data P1 by the control circuit 7, as compared to a case where error correction and extension is executed for the entire page data P1, the process load of error correction and extension can be reduced, and the power efficiency of the control circuit 7 can be improved. In the first embodiment, the control circuit 7 may execute error correction and extension for part of the page data P1 including the value which is the retrieval result, and in this case, the process load can also be reduced and the power efficiency of the control circuit 7 can also be improved.

In the first embodiment, since processes such as retrieval of the value in the page data P1 and error correction and extension of the retrieved value or partial data including the value are executed by the control circuit 7 which consumes less power than the processor 3, the power efficiency of the storage system 1 can be improved.

In the first embodiment, the nonvolatile memory 10 is assumed to be, for example, greater than or equal to 10 megaIPOS, and the page size is assumed to be about 4 kilobytes. In this case, if the page data P1 read from the nonvolatile memory 10 is directly transferred from the control circuit 7 to the processor 3 via the interface circuit 6 and the data transfer bus 5, data transfer between the internal bus in the processor 3 and the data transfer bus 5 may be obstructed. However, in the first embodiment, the value which is part of the page data P1 and corresponds to the retrieval key is retrieved by the control circuit 7, and the retrieved value is transferred from the control circuit 7 to the processor 3 via the interface circuit 6 and the data transfer bus 5. Therefore, it is possible to prevent the obstruction on the data transfer between the internal bus in the processor 3 and the data transfer bus 5.

In a case where the storage system 1 according to the first embodiment includes a plurality of storage devices SD1 to SDk, the control circuits 7 provided in the storage devices SD1 to SDk can execute the above-described processes in parallel with one another. Therefore, even if the number of the storage devices SD1 to SDk increases, an increase in the load on the processor 3 can be suppressed.

In the first embodiment, a plurality of values stored in the buffer memory 9 can be collectively transferred from the buffer memory 9 to the internal memory 12 of the processor 3 via the interface circuit 6 and the data transfer bus 5. Consequently, the number of data transfer processes between the storage device SD1 and the processor 3 can be reduced, and data of a predetermined size can be efficiently transferred between the storage device SD1 and the processor 3.

In the first embodiment, a plurality of keys in page data P1 are expressed by a binary tree and are serialized. As a result, the data size necessary for expressing one key can be reduced, and the number of pairs of keys and values which can be stored in the page data P1 can be increased.

Second Embodiment

The second embodiment is a modification example of the first embodiment.

Figure 12:
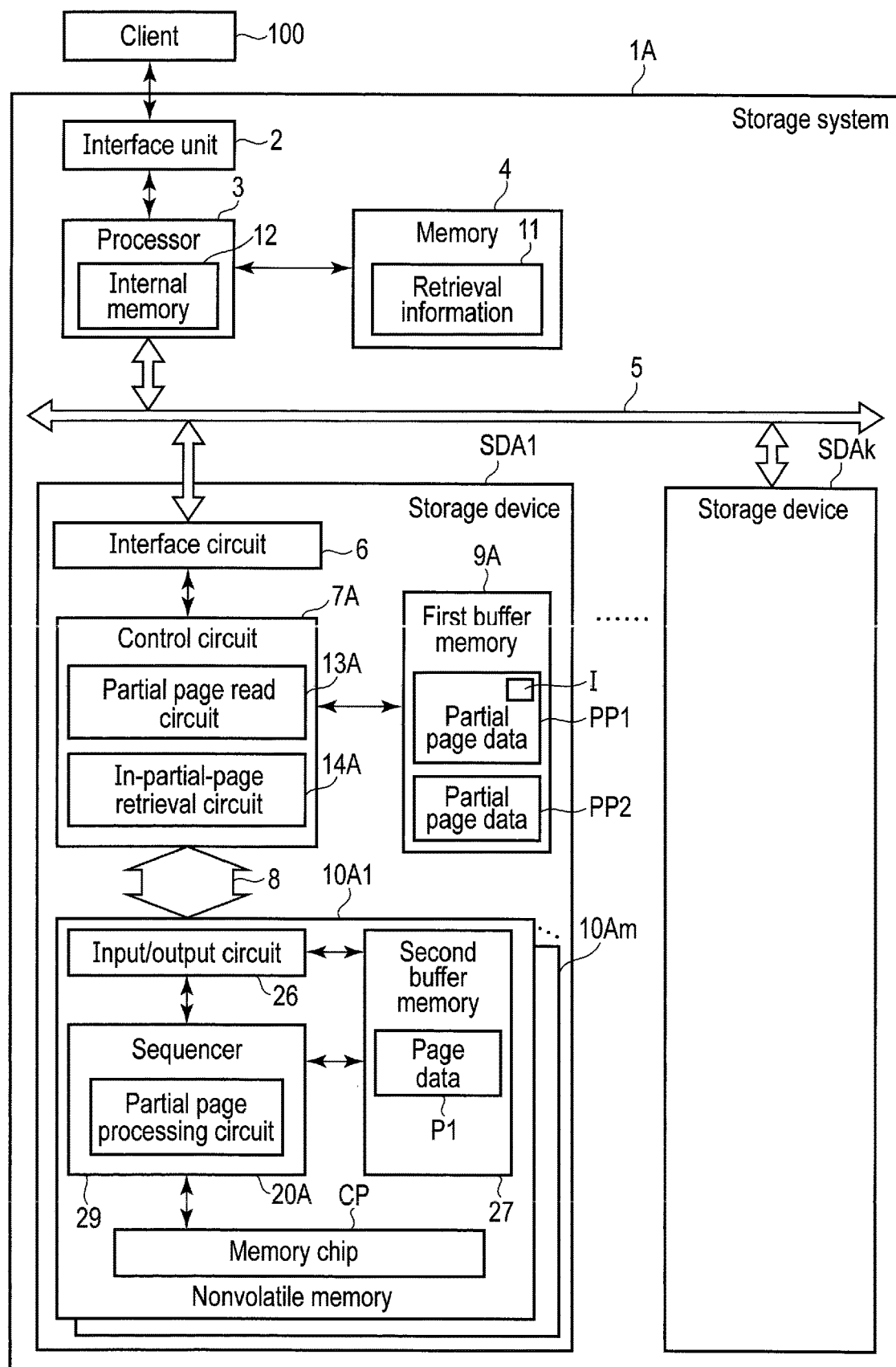
FIG. 12 is a block diagram showing an example of a configuration of a storage system according to a second embodiment.

FIG. 12 is a block diagram showing an example of the configuration of a storage system 1A according to the second embodiment.

The storage system 1A includes storage devices SDA1 to SDAk, but the other constituent elements are the same as those of the storage device 1 described in the first embodiment. In the second embodiment, the storage device SDA1 will be mainly explained, and the explanations of the other storage devices SDA2 to SDAk will be omitted.

The storage device SDA1 includes the interface circuit 6, a control circuit 7A, a first buffer memory 9A, and a plurality of nonvolatile memories 10A1 to 10An.

In the first embodiment, page data P1 is transferred from the nonvolatile memory 10 to the control circuit 7 via the transmission path 8, and page data P1 is stored in the buffer memory 9.

On the other hand, in the second embodiment, partial page data PP1 and partial page data PP2 which are part of page data P1 are transferred from the nonvolatile memory 10A to the control circuit 7 via the transmission path 8, and partial page data PP1 and partial page data PP2 are stored in the first buffer memory 9A.

First, the control circuit 7A will be explained.

The control circuit 7a includes a partial page read circuit 13A and an in-partial-page retrieval circuit 14A. In addition, the control circuit 7A includes the error correction circuit 15, the extension circuit 16 and the data transfer circuit 17 which are described in the first embodiment, but illustrations thereof are omitted in FIG. 12 for the sake of simplicity.

The control circuit 7A may be, for example, an FPGA. At least one function of the partial page read circuit 13A and the in-partial-page retrieval circuit 14A in the control circuit 7A may be realized by, for example, executing software such as firmware by, for example, the control circuit 7A which operates as a processor.

At least part of the partial page read circuit 13A and the in-partial-page retrieval circuit 14A may be realized by a constituent element different from that of the control circuit 7A.

Based on the read request received by the interface circuit 6, the partial page read circuit 13A transmits an initial partial read command for reading the partial page data PP1, which is a predetermined part of the page data P1 corresponding to the read request, to the nonvolatile memory 10A1 via the transmission path 8.

The partial page data PP1 may be the front part of the page data P1 or may be the other part of the page data P1. In the second embodiment, the partial page data PP1 is part of a tree structure, and includes information I for estimating what keys are arranged and where the keys are arranged in the page data P1.

Furthermore, the partial page read circuit 13A receives the partial page data PP1 obtained by the nonvolatile memory 10A1 in response to the initial partial read command, and stores the received partial page data PP1 in the first buffer memory 9A.

In place of the initial partial read command, the partial page read circuit 13A may transmit a read command for reading the page data P1 to the nonvolatile memory 10A1 via the transmission path 8. In this case, according to the received read command, the nonvolatile memory 10A trans- mits the partial page data PP1 in the page data P1 to the control circuit 7A via the transmission path 8. Subsequently, the partial page read circuit 13A receives the partial page data PP1 from the nonvolatile memory 10A1 via the trans- mission path 8 in response to the read command, and stores the received partial page data PP1 in the first buffer memory 9A.

The in-partial-page retrieval circuit 14A determines whether the retrieval key is included in the partial page data PP1 stored in the first buffer memory 9A or not.

If the retrieval key is included in the partial page data PP1, the in-partial retrieval circuit 14A retrieves a value corre- sponding to the retrieval key.

If the retrieval key is not included in the partial page data PP1, the in-partial-page retrieval circuit 14A requests the partial page data PP2 of the page data P1 which is estimated to include the retrieval key based on the partial page data PP1.

The partial page read circuit 13A transmits a partial read command for reading the partial page data PP2 to the nonvolatile memory 10A via the transmission path 8.

Subsequently, the partial page read circuit 13A receives the partial page data PP2 from the nonvolatile memory 10A1 via the transmission path 8 in response to the partial read command, and stores the received partial page data PP2 in the first buffer memory 9A.

The in-partial-page retrieval circuit 14A determines whether the retrieval key is included in the partial page data PP2 stored in the first buffer memory 9A or not.

If the retrieval key is included in the partial page data PP2, the in-partial retrieval circuit 14A retrieves a value corre- sponding to the retrieval key. The partial page read circuit 13A and the in-partial-page retrieval circuit 14A repeat transmission of a partial read command, receipt of partial page data corresponding to the partial read command, deter- mination of whether the retrieval key is included in the partial page data or not in the same manner until the partial page read circuit 13A and the in-partial-page retrieval circuit 14A receive partial page data including the retrieval key from the nonvolatile memory 10A via the transmission path 8.

The data transfer circuit 17, which is provided in the control circuit 7A but is not illustrated in FIG. 12, transmits the value corresponding to the retrieval key to the processor 3 via the interface circuit 6 and the data transfer bus 5.

Next, the nonvolatile memory 10A1 will be described.

The nonvolatile memory 10A1 includes the input/output circuit 26, a second buffer memory 27, a sequencer 20A and a memory chip CP. Although the other constituent elements of the nonvolatile memory 10A1 are not illustrated in FIG. 12 for the sake of simplicity, the nonvolatile memory 10A1 may appropriately include the same constituent elements as those of the nonvolatile memory 10 described above with reference to FIG. 5. The nonvolatile memory 10A1 may include a plurality of memory chips CP. One memory chip CP may include one or more memory cell arrays 23 described above with reference to FIG. 5. The nonvolatile memory 10A1 may be formed of one chip. The input/output circuit 26, the second buffer memory 2, the sequencer 20A and the memory chip CP provided in the nonvolatile memory 10A1 may be formed on the same semiconductor substrate.

The second buffer memory 27 may be formed of the register set 18 and the latch circuits SDL, ADL, BDL and XDL described above with reference to FIG. 5.

The sequencer 20A can execute the function of the sequencer 20 described in the first embodiment, and further includes a partial page processing circuit 29.

The partial page processing circuit 29 may be realized by a constituent element different from that of the sequencer 20A, and may be incorporated into the other constituent element such as the logical controller, for example.

The partial page processing circuit 29 receives an initial partial read command or read command from the control circuit 7A via the transmission path 8 and the input/output circuit 26.

In response to the received initial partial read command or read command, the partial page processing circuit 29 reads page data P1 corresponding to the initial partial read command or read command from the memory chip CP, and stores the page data P1 in the second buffer memory 27.

Subsequently, the partial page processing circuit 29 transmits partial page data PP1 included in the page data P1 to the control circuit 7A via the input/output circuit 26 and the data transfer bus 8.

In addition, the partial page processing circuit 29 receives a partial read command corresponding to partial page data PP2 which is estimated to include a retrieval key from the control circuit 7A via the transmission path 8 and the input/output circuit 26.

The partial page processing circuit 29 transmits the partial page data PP2 corresponding to the received partial read command of the page data P1 stored in the second buffer memory 27 to the control circuit 7A via the input/output circuit 26 and the data transfer bus 8.

Figure 13:
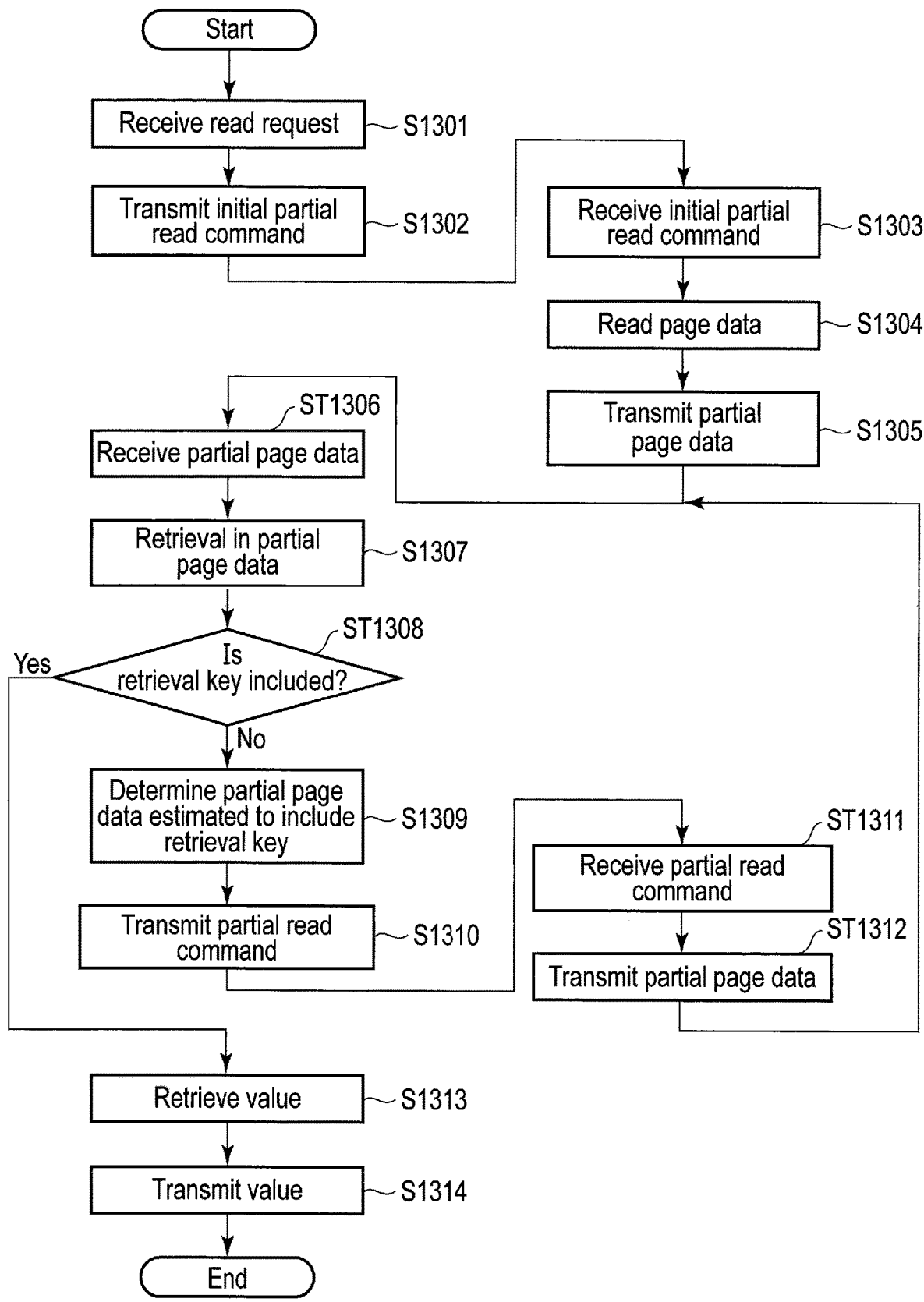
FIG. 13 is a flowchart showing an example of a process executed by a control circuit and a nonvolatile memory according to the second embodiment.

FIG. 13 is a flowchart showing an example of the process executed by the control circuit 7A and the nonvolatile memory 10A1 according to the second embodiment.

In step S1301, the partial page read circuit 13A receives a read request from the processor 3 via the data transfer bus 5 and the interface circuit 6.

In step 31302, based on the received read request, the partial page read circuit 13A transmits an initial partial read command for reading partial page data PP1 of page data P1 corresponding to the read request to the nonvolatile memory 10A1 via the transmission path 8.

In step S1303, the partial page processing circuit 29 receives the initial partial read command from the control circuit 7A via the transmission path 8 and the input/output circuit 26.

In step S1304, in response to the received initial partial read command, the partial page processing circuit 29 reads the page data P1 corresponding to the initial partial read command from the memory chip CP, and stores the read page data P1 in the second buffer memory 27.

In step S1305, the partial page processing circuit 29 transmits the partial page data PP1 included in the page data P1 to the control circuit 7A via the input/output circuit 26 and the transmission path 8.

In step S1306, the partial page read circuit 13A receives the partial page data PP1 from the nonvolatile memory 10A1 via the transmission path 8, and stores the received partial page data PP1 in the first buffer memory 9A.

In step S1307, the in-partial-page retrieval circuit 14A retrieves a retrieval key in the partial page data PP1 stored in the first buffer memory 9A.

In step S1308, the in-partial-page retrieval circuit 14A determines whether the retrieval key is included in the partial page data PP1 or not.

If the retrieval key is not included in the partial page data PP1, the in-partial-page retrieval circuit 14A requests, based on the partial page data PP1, partial page data PP2 of the page data P1 which is estimated to include the retrieval key in step S1309.

In step 31310, the in-partial-page retrieval circuit 14A transmits a partial read command for reading the partial page data PP2 to the nonvolatile memory 10A1 via the transmission path 8.

In step S1311, the partial page processing circuit 29 receives the partial read command for reading the partial page data PP2 from the control circuit 7A via the transmission path 8 and the input/output circuit 26.

In step S1312, the partial page processing circuit 29 transmits the partial page data PP2 corresponding to the partial read command of the page data P1 stored in the second buffer memory 27 to the control circuit 7A via the input/output circuit 26 and the transmission path 8. Subsequently, the process moves to step S1306, and the process from step S1306 to step S1308 is executed for the partial page data PP2.

If it is determined in step S1308 that the retrieval key is included in the partial page data PP1 or the partial page data PP2, the in-partial-page retrieval circuit 14A retrieves a value corresponding to the retrieval key in step S1313.

In step S1314, the data transfer circuit 17 transmits the value corresponding to the retrieval key to the processor 3 via the interface circuit 6 and the data transfer bus 5.

Figure 14:
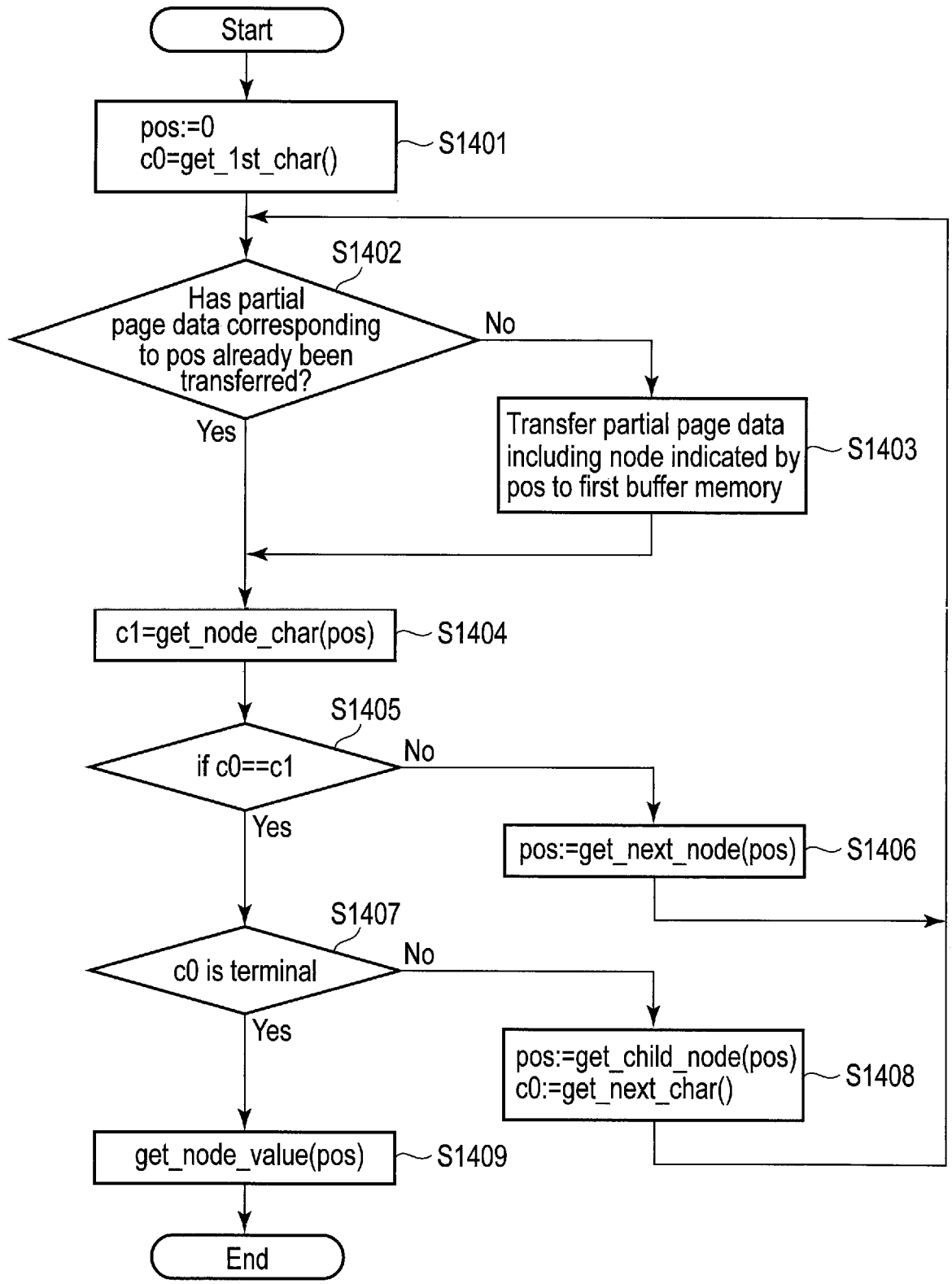
FIG. 14 is a flowchart showing an example of a process of a partial page read circuit and an in-partial-page retrieval circuit according to the second embodiment.

FIG. 14 is a flowchart showing an example of the process of the partial page read circuit 13A and the in-partial-page retrieval circuit 14A according to the second embodiment.

The process of step S1401 is executed by the in-partial-page retrieval circuit 13A, and the details of the process are the same as the above-described process of step S1101.

In step S1402, the partial page read circuit 13A determines whether partial page data including a node corresponding to the variable number pos has already been transferred from the nonvolatile memory 10A1 to the first buffer memory 9A via the transmission path 8 and the control circuit 7A or not.

If it is determined in step 31402 that the partial page data has already been transferred, the process moves to step S1404.

If it is determined in step 31402 that the partial page data has not been transferred, in step S1403, the partial page read circuit 13A transmits a partial page read command for reading the partial page data including the node corresponding to the variable number pos to the nonvolatile memory 10A1 via the transmission path 8. Subsequently, the partial page read circuit 13A receives the partial page data including the node corresponding to the variable number pos from the nonvolatile memory 10A1 via the transmission path 8 as a response to the partial page read command, and stores the received partial page data in the first buffer memory 9A.

The process from step S1404 to step S1409 is executed by the in-partial-page retrieval circuit 13A, and the details of the process are the same as the above-described process from step S1102 to step S1107.

In the second embodiment described above, partial page data PP1 and partial page data PP2 are transmitted from the nonvolatile memory 10A1 to the control circuit 7A via the transmission path 8. Consequently, in the second embodiment, as compared to the first embodiment, the amount of data transferred using the transmission path 8 can be reduced, and even if the bandwidth usable in the transmission path 8 is limited, retrieval can be executed for more data. In addition, in the second embodiment, the load on the transmission path 8 can be reduced, and therefore the power consumption can be reduced.

In the second embodiment, the number of nonvolatile memories 10A1 to 10Am which can be connected to the control circuit 7A and the transmission path 8 can be increased, and the storage capacity of the storage device SDA1 can be increased.

Third Embodiment

In the third embodiment, an example of the performance of the storage system 1 according to the first embodiment and the advantageous effects to be produced by the performance will be described.

In the storage system 1, for example, the amount of page data per unit time (for example, second) at which page data is read from the nonvolatile memory 10 is assumed to be greater than or equal to 10% of the amount of data per unit time transferable from the data transfer bus 5 to the processor 3.

In this case, the storage system 1 can reduce the amount of data per unit time transferred from the storage device SD1 to the data transfer bus 5 can be reduced to less than or equal to $\frac{1}{16}$ of the amount of data per unit time at which page data is read from the nonvolatile memory 10.

For example, in a case where the amount of data per unit time at which page data is read from the nonvolatile memory 10 is greater than or equal to 10% of the amount of data per unit time transferable from the data transfer bus 5 to the processor 3, if all the read page data is transmitted from the storage device SD1 to the processor 3 via the data transfer bus 5, the performance of the storage system 1 is greatly affected by the load on the data transfer bus 5. For example, when more than ten storage devices SD1 to SDk are used with respect to the data transfer bus 5, 100% of the amount of data transferable from the data transfer bus 5 to the processor 3 is read from the nonvolatile memory 10, and the amount of data may need to be reduced in some cases.

On the other hand, the storage system 1 can reduce the load on the data transfer bus 5 and can prevent degradation of the performance of the storage system 1. In addition, in the storage system 1, the data transfer amount of the data transfer bus 5 can be reduced, and the power consumption can be reduced.

Note that the explanation of the performance of the storage system 1 according to the first embodiment also applies to that of the storage system 1 according to the second embodiment.

Fourth Embodiment

In the fourth embodiment, an example of the performance of the storage system 1A according to the second embodiment and the advantageous effects to be produced by the performance will be described.

In the storage system 1A, for example, the amount of data per unit time at which page data is read from the nonvolatile memory 10 is assumed to be greater than or equal to 10% of the amount of data per unit time transferable from the data transfer bus 5 to the processor 3.

In this case, the storage system 1A can reduce the amount of data per unit time transmitted from the nonvolatile memory 10A1 to the transmission path 8 to less than or equal to $\frac{1}{4}$ of the amount of data per unit time at which page data is read in the nonvolatile memory 10A1.

In the storage system 1A described above, as is the case with the storage system 1 described in the third embodiment, the load on the data transfer bus 5 can be reduced.

In addition, in the storage system 1A, even if the bandwidth used in the transmission path 8 is limited, retrieval can be executed for more data.

Furthermore, in the storage system 1A, the load on the transmission path 8 can be reduced, and the consumption power can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control method of a storage system comprising a processor, a first memory, a storage device that includes a nonvolatile memory, a control circuit, and a second memory, the nonvolatile memory storing first data having a tree structure including a root node, a plurality of branch nodes which are lower-level nodes than the root node, and a plurality of leaf nodes which are lower-level nodes than the branch nodes, the control method comprising:
   storing, by the processor, the root node and at least part of the branch nodes stored in the nonvolatile memory in the first memory as retrieval information, the retrieval information not including the leaf nodes;
   retrieving, by the processor, location information of second data including a value, based on a retrieval key and the retrieval information, the retrieval information being stored in the first memory, the value being included in the first data, the value corresponding to the retrieval key;
   transmitting, by the processor, the location information and the retrieval key to the control circuit;
   reading, by the control circuit, at least part of the first data from the nonvolatile memory based on the location information and the retrieval key;
   storing, by the control circuit, the at least part of the first data in the second memory;
   retrieving, by the control circuit, the value corresponding to the retrieval key from the at least part of the first data; and
   transmitting, by the control circuit, the value to the processor, wherein
   the second memory is accessible faster than the nonvolatile memory by the control circuit,
   the root node includes a plurality of pairs of keys and location information of the branch nodes,
   each of the branch nodes includes a plurality of pairs of keys and location information of the leaf nodes, and
   each of the leaf nodes includes a plurality of pairs of keys and values.

2. The control method of claim 1, wherein the retrieval information includes the root node and the branch nodes but does not include the leaf nodes.

3. The control method of claim 1, further comprising:
   transmitting, by the processor, a read request for the retrieval information to the control circuit at a time of startup of the storage system;
   receiving, by the control circuit, the read request from the processor;
   reading, by the control circuit, the retrieval information from the nonvolatile memory based on the read request;
   transferring, by the control circuit, the retrieval information to the processor;

receiving, by the processor, the retrieval information from the control circuit; and storing, by the processor, the retrieval information in the first memory.

4. The control method of claim 1, wherein at least one of error correction or extension for the value corresponding to the retrieval key or part of the first data including the value is executed by the control circuit.

5. The control method of claim 1, wherein
the first data forms a tree structure based on a plurality of elements which are obtained by splitting a plurality of keys included in the first data, and has a data structure in which a plurality of values included in the first data are associated with the elements, and the control method further comprises:
searching, by the control circuit, the at least part of the data based on the retrieval key; and
retrieving, by the control circuit, the value corresponding to the retrieval key.

6. The control method of claim 1, further comprising:
receiving, by the control circuit, first partial data which is part of the first data from the nonvolatile memory; and
when the retrieval key is not included in the first partial data, receiving, by the control circuit, second partial data which is part of the first data and is different from the first partial data.

7. The control method of claim 6, further comprising:
estimating, by the control circuit, what keys are arranged and where the keys are arranged in the first data based on the first partial data; and
when the retrieval key is not included in the first partial data, requesting, by the control circuit, the second partial data based on the first partial data.

8. The control method of claim 7, wherein the first partial data includes information for estimating what keys are arranged and where the keys are arranged in the first data.

9. The control method of claim 6, further comprising:
when the control circuit is to read partial data which is part of the first data from the nonvolatile memory, transmitting, by the control circuit, a partial data read command to the nonvolatile memory; and
when the nonvolatile memory receives the partial data read command, transmitting, by the nonvolatile memory, the partial data of the first data read from a memory chip provided in the nonvolatile memory to the control circuit.

10. A control method of a storage system comprising a processor, a first memory, a data transfer bus, a transmission path, and a storage device that includes a nonvolatile memory storing first data, a control circuit, and a second memory, the control method comprising:
using the transmission path for data transfer between the control circuit and the nonvolatile memory;
using the data transfer bus for data transfer between the processor and the control circuit, a bandwidth used for the data transfer in the data transfer bus being less than a bandwidth used for the data transfer in the transmission path;

retrieving, by the processor, location information of second data including a value, based on a retrieval key and retrieval information, the retrieval information being stored in the first memory, the value being included in the first data, the value corresponding to the retrieval key;

transmitting, by the processor, the location information and the retrieval key to the control circuit;

reading, by the control circuit, at least part of the first data from the nonvolatile memory based on the location information and the retrieval key;

storing, by the control circuit, the at least part of the first data in the second memory, retrieving, by the control circuit, the value corresponding to the retrieval key from the at least part of the first data; and transmitting, by the control circuit, the value to the processor, wherein
the second memory is accessible faster than the nonvolatile memory by the control circuit.

11. The control method of claim 10, wherein an amount of data per unit time at which the at least part of the data is read from the first nonvolatile memory is greater than or equal to 10% of an amount of data per unit time that is transferrable from the data transfer bus to the processor.

12. The control method of claim 11, wherein an amount of data per unit time transferred from the storage device to the data transfer bus is less than or equal to 1/16 of an amount of data per unit time at which the at least part of the first data is read from the nonvolatile memory.

13. The control method of claim 11, wherein an amount of data transmitted from the nonvolatile memory to the transmission path is less than or equal to 1/4 of an amount of the at least part of the first data read in the nonvolatile memory.

14. The control method of claim 1, further comprising:
transmitting, by the processor, a read request for reading the root node and the at least part of the branch nodes to the storage device at a startup of the storage system, wherein the storing the root node and the at least part of the branch nodes in the first memory includes:
reading, by the storage device, the root node and the at least part of the branch nodes stored in the nonvolatile memory based on the read request;
transmitting, by the storage device, the read root node and the read at least part of the branch nodes to the processor; and
storing, by the processor, the root node and the at least part of the branch nodes transmitted from the storage device as the retrieval information in the first memory.

15. The control method of claim 10, wherein the second memory is located separately from the nonvolatile memory in the storage device.

* * * * *